United States Patent Office 3,801,666
Patented Apr. 2, 1974

---

3,801,666
CONCENTRATED CUPROUS NITRATE/PROPIO-NITRILE SOLUTIONS AS COMPLEXING AGENTS FOR OLEFIN SEPARATIONS
George C. Blytas, Houston, Tex., assignor to Shell Oil Company, Houston, Tex.
No Drawing. Filed Mar. 16, 1973, Ser. No. 342,115
Int. Cl. C07c 11/00
U.S. Cl. 260—677 A                                      6 Claims

ABSTRACT OF THE DISCLOSURE

Anhydrous cuprous nitrate/propionitrile solutions having high concentrations of cuprous ion, e.g., 15–26% by weight cuprous ion, and correspondingly low concentrations of cupric ion, e.g., 2–5% by weight cupric ion, and the preparation thereof by (1) contacting quantities of cupric nitrate and metallic copper sufficient to yield no more than about 4% cuprous ion in propionitrile solvent at elevated temperatures to produce a dilute propionitrile solution wherein the copper is present substantially in the cuprous form and (2) concentrating the dilute propionitrile solution. The concentrated cuprous nitrate/propionitrile solutions, thusly prepared, are useful in affecting the separation of olefinically unsaturated hydrocarbons from hydrocarbons of lesser degrees of unsaturation.

BACKGROUND OF THE INVENTION

Field of the invention

This invention relates to cuprous nitrate/propionitrile solutions which are useful as high capacity complexing agents in olefin separations. More particularly, this invention is directed to anhydrous cuprous nitrate/propionitrile solutions containing high concentrations of cuprous ion, their preparation and use as olefin complexing agents in a process for separating olefinically unsaturated hydrocarbons from hydrocarbons of lesser degrees of unsaturation.

It is well known that cuprous salts will react with olefins to form complexes in aqueous or non-aqueous solution. However, the tendency for cuprous ions to be oxidized to the cupric state or to disproportionate to the cupric ion and metallic copper (Equation I)

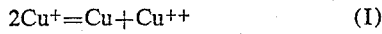

$$2Cu^+ = Cu + Cu^{++} \qquad (I)$$

detracts substantially from the viability of the use of cuprous salts in this application. This is especially true for cuprous salts of oxidizing anions such as cuprous nitrate. The standard oxidation potential of the $Cu^+$—$Cu^{++}$ couple is such that the nitrate ion will oxidize $Cu^+$ to such an extent that it is impossible to have appreciable concentrations of the $Cu^+$ ion in aqueous solution. Thus, if solutions containing useful quantities of free cuprous ion in the presence of nitrate anion are desired, the use of anhydrous cuprous nitrate in non-aqueous solvents would appear to be an alternative of considerable merit.

DESCRIPTION OF THE PRIOR ART

Solutions of anhydrous cuprous salts in nonaqueous solvents are known. Thus U.S. 2,376,239 of Evans et al., discloses anhydrous cuprous salt solutions in solvent consisting of a monohydric and/or polyhydric alcohol and a nitrogen base. Also, U.S. 2,275,135 to Fasce discloses anhydrous solutions of cuprous copper in ethylene glycolacetonitrile. However, both of these disclosures employ solvents which are alcoholic in nature, i.e., both contain hydroxy moieties, which tend to promote disproportionation of cuprous copper to cupric copper, thus decreasing the stability of the cuprous ion in solution. Attempts to prepare anhydrous solutions of cuprous salts in acetonitrile are also described. However, Hathaway et al., J. Chem. Soc. 3215 (1961) disclose that cuprous nitrate forms a solid complex with acetonitrile.

U.S. 3,449,240 to Blytas et al., describes the preparation of an anhydrous solution of cuprous sulfate in propionitrile, stating that solutions containing up to 30% by weight cuprous copper can be prepared. However, when applied to the preparation of cuprous nitrate/propionitrile solutions, the procedures disclosed in Blytas et al., have not proved to be viable. Cuprous nitrate is not sufficiently stable in the absence of a solvent to allow the make-up of cuprous nitrate/propionitrile solutions by direct dissolution of cuprous nitrate in propionitrile solvent using practical means. Additionally, when stoichiometric amounts of cupric nitrate and metallic copper are contacted at elevated temperatures in propionitrile in quantities sufficient to yield cuprous ion concentrations as low as 5% by weight in propionitrile solution, i.e., the cupric nitrate and metallic copper both being present at 2.5% by weight—conversions of cupric ion and copper metal to cuprous ion of only about 50% appear to be the maximum obtainable even after extended periods of reaction at elevated temperature.

SUMMARY OF THE INVENTION

It has now been found that concentrated, anhydrous cuprous nitrate/propionitrile solutions containing about 15 to 26% by weight cuprous ion and about 2 to 5% by weight cupric ion can be prepared by a process which comprises the steps of (1) contacting quantities of cupric nitrate and metallic copper sufficient to yield on complete conversion no more than about 4% cuprous ion in propionitrile solution at elevated temperatures to produce a dilute propionitrile solution wherein copper is present substantially in the cuprous form, and (2) removing a portion of the propionitrile solvent to obtain the concentrated solution. The preparation of the anhydrous cuprous nitrate/propionitrile solutions of the instant invention is based on the discovery that nearly complete conversion of cupric nitrate and metallic copper to cuprous nitrate can be obtained by heating in propionitrile solutions only if the concentrations of cupric nitrate and metallic copper initially present in the solution are maintained at low levels, i.e., at or below concentrations sufficient to yield about 4% cuprous ion, if complete conversion is assumed.

The concentrated cuprous nitrate/propionitrile solutions of the instant invention are sufficiently stable to be useful as complexing agents in affecting the separation of olefinically unsaturated hydrocarbons from hydrocarbons of lesser degrees of unsaturation. Moreover, when utilization in this application the cuprous nitrate/propionitrile solutions of the instant invention exhibit very high volume capacity for olefins coupled with very high selectivity for olefinically unsaturated hydrocarbons relative to saturated or lesser unsaturated hydrocarbons. The process for separation of at least two hydrocarbons of different degrees of unsaturation by selectively complexing a more highly unsaturated with cuprous nitrate in the propionitrile solutions of the instant invention forms another aspect of this invention.

DESCRIPTION OF THE PREFERRED EMBODIMENTS

Preparation of cuprous nitrate/propionitrile solutions

In accordance with the present invention, anhydrous solutions of cuprous nitrate in propionitrile are prepared by a process which comprises, in basic terms (1) preparation of a dilute cuprous nitrate/propionitrile solution wherein copper is present substantially in the cuprous form by contacting critically small amounts of cupric nitrate and metallic copper present at approximately stoichiometric ratios at elevated temperatures in propionitrile solvent and (2) concentration of the dilute cuprous nitrate/propionitrile solution.

The preparation of the dilute cuprous nitrate/propionitrile solution essential to the process of the invention is facilitated by the discoverey that substantially complete reduction of cupric nitrate by metallic copper, according to the stoichiometry described in Equation II, can be obtained at elevated temperatures in propionitrile solution if the concentrations of cupric nitrate and metallic copper are maintained below a critical maximum.

$$Cu(NO_3)_2 + Cu^\circ \xrightarrow[EtCN]{\Delta} 2\ CuNO_3 \qquad (II)$$

Thus, in preparing the dilute cuprous nitrate/propionitrile solution according to the process of the invention, it is essential that the cupric nitrate and metallic copper, contacted at elevated temperatures in propionitrile solvent, be present at approximately stoichiometric ratios in amounts no larger than those sufficient to yield about 4% by weight cuprous ion on complete reduction of the cupric nitrate. Most complete reductions are obtained with amounts of cupric nitrate and metallic copper sufficient to yield a propionitrile solution containing about 2 to 3% cuprous ion on complete reduction of the curic nitrate. Therefore, it is preferred that amounts of cupric nitrate and metallic copper employed be limited to those quantities sufficient to yield 2–3% cuprous nitrate on complete reduction of the cupric nirate. Since the stoichiometry of the reduction reaction is such that complete conversion of one mole of each reactant will yield two moles of cuprous nitrate product, the concentrations of cupric nitrate and metallic copper in propionitrile solution while are critical to the process of the invention may be otherwise conveniently expressed in terms of the concentration of each reactant in propionitrile solution. On this basis the concentration of each reactant should not exceed about 2% by weight, the cupric nitrate concentration being expressed in terms of cupric ion concentration, with concentrations in the range of about 1 to 1.5% by weight being preferred. In any case the stoichiometry of the reaction dictatates that approximately equal concentrations of cupric ion and metallic copper in propionitrile solution are suitable, though minor deviations from stoichiometric ratios may be tolerated and, in fact, a slight excess of metallic copper, i.e., about 5–10%, is preferred.

To prepare the dilute cuprous nitrate/propionitrile solution the cupric nitrate and metallic copper reactants may be contacted in propionitrile solvent in any conventional manner. Due to the deleterious effects of oxygen and water on the reaction, the cupric nitrate and metallic copper are desirably supplied to the reaction in substantially anhydrous form and the reaction is suitably conducted under an inert, i.e., oxygen-free and substantially anhydrous, reaction environment. Thus, it has been found convenient, to add the cupric nitrate and metallic copper, usually in the form of chunks, fine-mesh particles or a powder, to a reaction vessel containing anhydrous propionitrile solvent under an inert atmosphere, to which heat from an external source and agitation are supplied. However, other methods of conducting the reaction, including continuous reaction procedures are equally suitable and are not precluded.

As stated above, in order to obtain substantial conversion (at least 60%) of the cupric nitrate and metallic copper in dilute propionitrile solution to cuprous nitrate it is necessary to contact the reactants in propionitrile solution at elevated temperatures. Suitably, substantial conversions of cupric nitrate and metallic copper to cuprous nitrate are obtained by heating the dilute propionitrile solution at temperatures in the range of about 50 to 120° C. for periods of time ranging from 0.5 to 50 hours, the reaction time being inversely related to the reaction temperature. Preferably, the reaction is conducted in refluxing propionitrile solvent (Ca 100° C.) for periods of time ranging from 1 to 8 hours. At a reaction temperature and reaction times within this preferred range, conversions of cupric nitrate and metallic copper to cuprous nitrate ranging from 65 to 95% are readily obtainable.

The final step of the process of the invention contemplates concentration of the dilute cuprous nitrate solution prepared in the previous step of the process by removal of a portion of the propionitrile solvent. This concentration step may be accomplished by any conventional procedure by which a controlled quantity of propionitrile solvent can be removed from the solution, e.g., overhead distillation of the propionitrile at atmospheric or superatmospheric pressures, distillation in a vacuum and the like. The cuprous nitrate/propionitrile solution is somewhat susceptible to thermal decomposition at temperatures above 110° C., especially at higher concentrations of cuprous nitrate in propionitrile. Therefore, in larger scale equipment it is desirable to concentrate the dilute propionitrile solution by distillation in a slight vacuum. For example, in order to obtain solutions containing 17–18%/w. Cu(I) terminal conditions of 95 to 100° C. and 550 to 730 mm. Hg are suggested. The terminal conditions, in practice, will be dictated by equipment limitations and by the concentration of cuprous nitrate desired. Any solid residue remaining in the concentrated propionitrile solution from, for example, the employment of a slight stoichiometric excess of copper metal in the first step of the process, may be removed by any convenient means, e.g., by filtration of the solution or decanting of same. The excess copper can be used in subsequent solution preparations.

Concentrated cuprous nitrate/propionitrile solutions

The concentrated cuprous nitrate/propionitrile solution prepared by the process of the invention comprise anhydrous propionitrile solutions containing concentrations of cuprous ion ranging from about 15 to 26% by weight and cupric ion concentrations ranging from about 2 to 5% by weight. Preferably, the anhydrous cuprous nitrate/propionitrile solutions of the instant invention contain cuprous ion concentrations ranging from about 20 to 26% by weight and cupric ion concentrations ranging from about 3 to about 4.5% by weight. The maximum concentration of cuprous ion in the propionitrile solvent appears to be limited solely by the solubility of the cuprous salt in the propionitrile solvent, which, in turn, is somewhat dependent on the temperature at which the solution is maintained. Thus at 30° C. propionitrile solutions saturated with cuprous nitrate contain about 25% by weight cuprous ion, whereas at 50° C. the cuprous ion concentration of saturated cuprous nitrate/propionitrile solutions is about 26%/w. cuprous ion. The corresponding cupric ion concentration present in the concentrated cuprous nitrate/propionitrile solutions of the invention is largely dependent on the extent that cupric nitrate is reduced in the first step of the process of the invention (see above), little or no cupric ion being formed in the concentration step of the process. In most applications of the process of the invention conversions of cupric nitrate and metallic copper to cuprous nitrate of about 85 to 90% are readily obtainable in the first step of the process. Thus, saturated cuprous nitrate/propionitrile solutions at 30° C. preferably contain about 3% by weight cupric ion while saturated solutions at 50° C. preferably contain about 4.5% by weight cupric ion.

Olefin separation process

The concentrated, anhydrous cuprous nitrate/pripionitrile solutions of the invention possess extremely high capacities for solubilizing (complexing) olefinically unsaturated hydrocarbons coupled with very high selectivities, for olefinically unsaturated hydrocarbons over saturated or lesser unsaturated hydrocarbons. Moreover, the concentrated cuprous nitrate/propionitrile solutions of the invention in contrast to many cuprous ion complexing agent solutions, are essentially non-corrosive to conventional steel alloy processing equipment. Thus, another aspect of this invention comprises a process of separating mixtures of closely boiling hydrocarbons consisting essentially of at least two hydrocarbons of different degrees of unsaturation by selectively complexing a more highly saturated hydrocarbon with cuprous nitrate in propionitrile solvent, seprating the complex from the uncomplexed hydrocarbons, and subsequently decomposing the complex to recover the hydrocarbon therefrom, said cuprous nitrate in propionitrile solvent comprising a concentrated, anhydrous solution containing from about 15 to 26% by weight cuprous ion and about 2 to 5% by weight cupric ion.

The process of the invention is advantageously employed for mixtures of closely boiling aliphatic hydrocarbons having from 2 to 10 carbon atoms, preferably 3 to 6 carbon atoms. Thus the process of the invention is particularly suitable for separating aliphatic monoolefins from closely boiling saturated hydrocarbons and for separating aliphatic diolefins from closely boiling aliphatic monoolefins and saturated hydrocarbons. Exemplary of suitable hydrocarbon separations according to this preferred embodiment are ethylene from ethane and methane; propylene from propane; ethylene and/or propylene from propane, ethane and methane; butadiene from butenes and butane; isoprene from isoamylenes, n-pentenes, pentanes and the like; and hexadienes from hexenes and hexanes. The hydrocarbon stream to be separated by application of this aspect of the invention may also contain other gaseous materials that are inert to the cuprous nitrate such as hydrogen which is typically found in gas oil and naphtha pyrolyzates, said pyrolyzates being suitable feedstock materials for the separation process of this invention. In addition, the process of the invention is suitable for the separation of a mixture of butadiene-isoprene from $C_4$-$C_5$ stream or for the separation of lower cyclic monoolefins from lower saturated, cyclic hydrocarbons, e.g., cyclopentene from cyclopentane.

Any suitable method of contacting the hydrocarbon mixture and the cuprous nitrate/propionitrile solution can be employed. A preferred procedure is to countercurrently contact the hydrocarbon mixture with the cuprous nitrate/propionitrile solution in an extractive distillation column. Typically the cuprous nitrate/propionitrile solution is fed into the top of the column and the hydrocarbon feeds are volatilized into the column at various lower levels along the column; the cuprous ion-diolefin or olefin complex in propionitrile solution being removed as bottom product from the column. The temperature employed in the extractive distillation varies from about 30° C. to about 80° C. The pressures employed vary from about 70 to 140 p.s.i.a. in butadiene purifications to about 200 to 450 p.s.i.a. in ethylene and/or propylene purifications. Useful hydrocarbon feed mixture to cuprous nitrate/propionitrile weight ratios range from about 0.3±0.1/1 for butadiene recovery from $C_6$-unsaturates to about 0.1±0.05/1 for ethylene recovery applications. The exact ratio depends on the concentration of unsaturates in the feed. It is generally preferred to effect the contacting of the cuprous copper solution and hydrocarbon feed in an inert, i.e., oxygen free and substantially anhydrous, reaction environment. The bottoms product from the extractive distillation column is suitably passed into a solvent stripper, which may involve one or more stripping steps, wherein the desired olefin and/or diolefin is removed from the cuprous nitrate/propionitrile solution as an overhead vapor. The stripping operation is typically conducted at temperatures ranging from about 40° C. to about 100° C., being substantially dependent on the volatility of the olefinic hydrocarbon. Due to the instability of the cuprous nitrate in oxidizing atmospheres it is quite desirable to operate the solvent stripping phase of the process under positive pressures, pressures ranging from about 20 p.s.i.a. to about 35 p.s.i.a. being preferred. To facilitate operation at positive pressures, it has been found advantageous to add small amounts, e.g., about 2 to 7% by weight of the total feed to the stripper, of higher molecular weight saturated hydrocarbons to the solvent stripper, e.g., cyclohexane for recovery of butadiene, or pentane for recovery of ethylene.

Illustrative Embodiment I

The preparation of concentrated cuprous nitrate/propionitrile solutions by reduction of cupric nitrate with metallic copper in propionitrile solvent was carried out in a series of runs employing different initial concentrations of cupric nitrate and metallic copper. The procedure is followed in all the runs involved adding measured amounts of anhydrous cupric nitrate and metallic copper to anhydrous propionitrile solvent under an inert nitrogen atmosphere followed by a reaction period wherein the reaction mass was heated to reflux (98° C.) for varying periods of time. Samples of the reaction mass were withdrawn at periodic intervals through the reflux period for analysis to check the extent of conversion. The reflux period was continued until either substantial conversion of reactants to cuprous nitrate was obtained or until such time that significant further conversion appeared improbable. The results of these runs are listed in Table I below wherein the reactant charge is shown as the initial concentration, in percent by weight of total solution, of cupric ion and copper metal and the percent conversion to cuprous ion is based on the percent of available copper metal which has reacted.

TABLE I

| Run number | Initial concentration in propionitrile solution | | Time (hrs.) at reflux conditions | Percent conversion to Cu⁺ |
|---|---|---|---|---|
| | Cu⁺⁺ | Cu° | | |
| 1 | 1.25 | 1.25 | 2 | 85 |
| 2 | 1.28 | 1.28 | 2 | 70 |
| 3 | 2.50 | 2.50 | 10 | 30 |
| 4 | 2.50 | 2.50 | 48 | 50 |
| 5 | 5.1 | 5.1 | 24 | 52 |

The dilute cuprous nitrate/propionitrile solution prepared in run number 1, Table I, was subsequently concentrated by distillation in a vacuum to terminal conditions of 40 mm. Hg and 50° C. to yield a saturated cuprous nitrate/propionitrile solution containing 26% by weight cuprous ion and 4.5% by weight cupric ion.

Illustrative Embodiment II

The volumetric capacity of cuprous nitrate/proprionitrile solutions, prepared according to the procedure described in Illustrative Embodiment I, as well as various other cuprous salt solutions for ethylene propylene, ethane and propane at partial pressures up to 120 p.s.i.a. was determined in a series of comparative experiments. The general procedure employed in this series of experiments was as follows: A measured quantity of the cuprous salt solution to be tested was charged to a pressure tight vessel equipped with a stirrer. The cuprous salt solution so charged was then frozen by contacting the vessel with liquid nitrogen, and the vapor space in the vessel was evacuated. A measured volume of the hydrocarbon to be tested was then introduced slowly with stirring into the evacuated test vessel until the pressure remained constant at a predetermined level. The vessel was weighed before the cuprous salt solution was charged, after the cuprous salt solution was charged and after the hydrocarbon was adsorbed. The capacities were then calculated by volumes. The volume of the test vessel including the vapor space was measured by water volume. The volume of the solution was calculated by weight and density measurements and in some cases the solution charge was introduced into the test vessel by volume measurement. Corrections were made for the weight of the hydrocarbon in the vapor space of the vessel. The volume capacities were measured in cuprous salt solutions maintained at three different temperatures, i.e., 25, 50 and 75° C. and at three hydrocarbon partial pressures, i.e., 15, 80 and 120 p.s.i.a. The results are shown in Table II, below.

TABLE II

[Volumetric capacities[1] of cuprous salt solutions for ethylene ($C_2=$), propylene ($C_3=$), ethane ($C_2$) and propane ($C_3$)]

| Cuprous salt solution | Percent wt. Cu(I) | Grams Cu(I) liter | Temp., °C. | 15 p.s.i.a. $C_2=$ | 15 p.s.i.a. $C_3=$ | 80 p.s.i.a. $C_2=$ | 80 p.s.i.a. $C_3=$ | 120 p.s.i.a. $C_2=$ | 120 p.s.i.a. $C_3=$ | 120 p.s.i.a. $C_2$ | 120 p.s.i.a. $C_3$ |
|---|---|---|---|---|---|---|---|---|---|---|---|
| Cuprous nitrate/proprionitrile | 18.2 | 210 | 25 | 18 | 9 | 41 | 35 | 47 | 43 | 6.6 | 7. |
| Do | 22.6 | 315 | 25 | 25 | 29 | 57 | 61 | 68 | 79 | ~1 | ~ |
| Cuprous trifluoroacetate/propionitrile | 19.0 | 230 | 25 | 25 | 25 | 63 | 63 | 74 | 75 | | 1 |
| Cuprous nitrate/ethanolamine/water | | 220 | 25 | 18 | 6 | 44 | 21 | | | ~1 | |
| Cuprous sulfate/propionitrile | 17.5 | 220 | 50 | 8 | | 32 | | 36 | | | |
| Cuprous nitrate/propionitrile | 18.2 | 210 | 50 | 15 | 5 | 34 | 22 | 40 | 29 | 5.8 | 5.5 |
| Do | 22.6 | 315 | 50 | 23 | 16 | 47 | 47 | 54 | 58 | ~1 | ~1 |
| Cuprous trifluoroacetate/propionitrile | 19.0 | 230 | 50 | 15 | 14 | 49 | 44 | 68 | 54 | | 6 |
| Cuprous nitrate/ethanolamine/water | | 220 | 50 | [2]7 | [2]2 | [2]9 | | | | | |
| Cuprous nitrate/propionitrile | 18.2 | 210 | 75 | 13 | 3 | 25 | 11 | 31 | 14 | 4.2 | 4.5 |
| Do | 22.6 | 315 | 75 | 16 | 9 | 34 | 29 | 39 | 37 | <1 | 1 |
| Cuprous trifluoroacetate/propionitrile | 19.0 | 230 | 75 | 9 | 7 | 21.4 | 16 | 44 | 27 | | ~1 |

[1] Volumetric capacities are given in liters of gas measured at 25° C., 1 atm. per liter of solution. The uncertainty is ±4% of the reported value, due to non-ideality corrections, interpolation, experimental precision, and approximations in estimating partial molar volumes of complexed ethylene.
[2] Estimated on the basis of data at 20° C. and 40° C.

Illustrative Embodiment III

The effect of increasing the concentration of cuprous ion in cuprous nitrate/propionitrile solutions on the ethylene capacity of the solution was demonstrated in a series of experiments performed according to the general procedure described in Illustrative Embodiment II. In this series of runs the cuprous nitrate/propionitrile solution was maintained at 40°C. and the ethylene partial pressure employed was 220 p.s.i.a. The results are shown in Table III below.

TABLE III

| Solution | Percent wt. Cu(I) | EtCN/ Cu(I) molar ratio | Grams ethylene/ 100 g. solvent | Ethylene/ Cu(I) |
|---|---|---|---|---|
| I | 22.6 | 2.8 | 8.5 | 0.85 |
| II | 24.5 | 2.4 | 10.6 | 0.98 |
| III | 26 | 1.9 | 13.0 | 1.1 |

Increasing the Cu(I) concentration from 22.6% to 24.5% in solution II increases the ethylene capacity by 25%. A further increase in olefin capacity is achieved when the Cu(I) concentration is raised to 26%.

Illustrative Embodiment IV

The thermal stability of various cuprous nitrate/propionitrile solutions was evaluated for temperatures in the range of 95 to 115° C. by maintaining a neat cuprous nitrate/propionitrile solution at a preselected temperature for exposure times ranging from 19.5 to 142 hours and sampling the solution at periodic intervals to determine the extent of cuprous ion decomposition. The results are shown in Table IV below.

TABLE IV

| Temp., °C. | Hours of exposure | Approximate percent wt. Cu(I) Initial | Approximate percent wt. Cu(I) Final |
|---|---|---|---|
| 95 | 19.5 | 17.4 | 16.6 |
| 100 | 25 | 16.5 | 16.2 |
| 105 | 96 | 16.1 | 13.4 |
| 110 | 95 | 13.3 | 9.2 |
| 115 | 142 | 9 | 6 |

I claim as my invention:

1. An anhydrous solution of cuprous nitrate in propionitrile solvent containing about 15 to 26% by weight cuprous ion and no more than about 2 to 5% by weight cupric ion.

2. The solution of claim 1 containing about 20 to 26% by weight cuprous ion and no more than about 3 to 4.5% by weight cupric ion.

3. A process for preparing concentrated, anhydrous cuprous nitrate/propionitrile solutions containing about 15 to 26% by weight cuprous ion and about 2 to 5% by weight cupric ion which comprises (1) contacting quantities of cupric nitrate and metallic copper sufficient to yield on complete conversion no more than about 4% by weight cuprous ion in propionitrile solution at elevated temperatures to produce a dilute propionitrile solution wherein copper is present substantially in the cuprous form, and (2) removing a portion of the propionitrile solvent to obtain the concentrated solution.

4. The process of claim 3 wherein approximately equimolar quantities of the cupric nitrate and metallic copper are contacted in propionitrile solvent at temperatures in the range of about 50 to 120° C. for periods of time ranging from 0.5 to 50 hours.

5. The process of claim 4 wherein the cupric nitrate and metallic copper are contacted in propionitrile solution in concentrations sufficient to yield about 2 to 3% by weight cuprous ion on complete reduction of the cupric nitrate.

6. In the process for separating mixtures of closely boiling aliphatic hydrocarbons having from 2–10 carbon atoms consisting essentially of at least two hydrocarbons of different degrees of unsaturation by selectively complexing a more highly unsaturated hydrocarbon with a cuprous ion containing copper salt in nonaqueous solvent, and subsequently decomposing the complex to recover the hydrocarbon therefrom; the improvement which comprises complexing the more unsaturated hydrocarbon with an anhydrous solution of cuprous nitrate in propionitrile solvent containing from about 15 to about 26% by weight cuprous ion and no more than about 2 to about 5% by weight cupric ion.

References Cited

UNITED STATES PATENTS

| 2,376,239 | 5/1945 | Evans | 260—67.7 A |
| 2,275,135 | 3/1942 | Fasce | 260—681.5 |
| 3,449,240 | 6/1969 | Blytas et al. | 208—308 |

DELBERT E. GANTZ, Primary Examiner

J. M. NELSON, Assistant Examiner

U.S. Cl. X.R.

260—681.5 (C); 208—308; 252—189